(12) United States Patent
Iwashita et al.

(10) Patent No.: US 9,994,193 B2
(45) Date of Patent: Jun. 12, 2018

(54) ELECTRONIC KEY SYSTEM

(71) Applicant: KABUSHIKI KAISHA TOKAI RIKA DENKI SEISAKUSHO, Aichi (JP)

(72) Inventors: Hiroaki Iwashita, Aichi (JP); Kohei Kishimoto, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days. days.

(21) Appl. No.: 15/569,120

(22) PCT Filed: Jun. 1, 2016

(86) PCT No.: PCT/JP2016/066099
§ 371 (c)(1),
(2) Date: Oct. 25, 2017

(87) PCT Pub. No.: WO2016/194921
PCT Pub. Date: Dec. 8, 2016

(65) Prior Publication Data
US 2018/0111585 A1    Apr. 26, 2018

(30) Foreign Application Priority Data

Jun. 1, 2015 (JP) .................................. 2015-111476

(51) Int. Cl.
*B60R 25/24* (2013.01)
*B60R 25/32* (2013.01)
(Continued)

(52) U.S. Cl.
CPC .......... *B60R 25/246* (2013.01); *B60N 2/0232* (2013.01); *B60R 25/245* (2013.01);
(Continued)

(58) Field of Classification Search
CPC ..... B60R 25/246; B60R 25/245; B60R 25/32; B60N 2/0232; G07C 2009/00515
(Continued)

(56) References Cited

U.S. PATENT DOCUMENTS 6,791,456 B2 * 9/2004 Nakayama ............ B60R 25/102
340/426.3
7,567,181 B1 * 7/2009 Davison ................... B60Q 9/00
340/457

FOREIGN PATENT DOCUMENTS

JP    2011-052505    3/2011
JP    2014-091434    5/2014

OTHER PUBLICATIONS

Official Communication issued in Japan Patent Application No. PCT/JP2016/066099, dated Aug. 9, 2016.
(Continued)

*Primary Examiner* — Allen T Cao
(74) *Attorney, Agent, or Firm* — Greenblum & Bernstein, P.L.C.

(57) ABSTRACT

This electronic key system includes: an electronic key which is enabled to engage in radio communication with a vehicle on condition that a vibration is detected by a vibration detection part; and the vehicle which has an on-board control part for starting an engine on condition that the radio communication with the electronic key is established, and a push switch installed in the vehicle is operated. The on-board control part causes the vehicle to be vibrated by the engine on condition that the push switch is operated.

10 Claims, 3 Drawing Sheets

(51) Int. Cl.
*E05B 19/00* (2006.01)
*G01H 1/12* (2006.01)
*B60N 2/02* (2006.01)
*G07C 9/00* (2006.01)

(52) U.S. Cl.
CPC .......... *B60R 25/32* (2013.01); *E05B 19/0082* (2013.01); *G01H 1/12* (2013.01); *G07C 2009/00515* (2013.01); *G07C 2009/00547* (2013.01)

(58) Field of Classification Search
USPC ................................................. 340/5.7–5.74
See application file for complete search history.

(56) References Cited

OTHER PUBLICATIONS

International Preliminary Report on Patentability for PCT/JP2016/066099, dated Dec. 5, 2017, with English language translation.

\* cited by examiner

ELECTRONIC KEY SYSTEM

TECHNICAL FIELD

The present invention relates to an electronic key system.

BACKGROUND ART

An electronic key system known in the prior art allows a door lock to be switched between a locked state and an unlocked state or allows the engine to be started when wireless communication is established between an electronic key and a vehicle.

The electronic key used in the electronic key system of patent document 1 includes a vibration sensor. The electronic key establishes wireless communication with the vehicle when the vibration sensor detects vibration. When the electronic key is still such as when the electronic key is stored in a residence, the electronic key does not perform wireless communication. Thus, wireless communication cannot be established in an unauthorized manner between the electronic key and the vehicle even when using a relay that relays radio waves.

PRIOR ART DOCUMENT

Patent Document

Patent Document 1: Japanese Laid-Open Patent Publication No. 2014-91434

SUMMARY OF THE INVENTION

Problems that are to be Solved by the Invention

When, for example, the driver is taking a nap in the vehicle, it can be assumed that the electronic key is still. In this case, after the driver wakes up and operates a switch to start the engine, the electronic key does not perform wireless communication because the electronic key is continues to be still. Since wireless communication is not established between the electronic key and the vehicle, the driver needs to shake and vibrate the electronic key to start the engine. In this manner, the electronic key system of patent document 1 may lead to a situation that is inconvenient for the driver.

Accordingly, it is an object of the present invention to provide an electronic key system that is convenient for the driver.

Means for Solving the Problem

One aspect of the present invention is an electronic key system including a vehicle and an electronic key. The vehicle includes an onboard device, an onboard controller that controls the onboard device, an operation unit that is operable by a user, and a vibration unit that vibrates at least part of the vehicle. The electronic key includes a vibration sensor that detects vibration. The electronic key is configured to be capable of establishing wireless communication with the onboard controller when the vibration sensor detects vibration. The onboard controller is configured to vibrate at least part of the vehicle with the vibration unit in response to operation of the operation unit by the user, determine whether wireless communication has been established between the electronic key and the vehicle, and actuate the onboard device when determining that wireless communication has been established.

With this system, for example, when the driver has taken a nap and the electronic key has been still, the driver can operate the operation unit to vibrate at least part of the vehicle so that the vibration is transmitted to the electronic key. This allows the electronic key to establish wireless communication with the vehicle. Thus, wireless communication is established between the electronic key and the vehicle. In this manner, the driver just operates the operation unit to actuate the onboard device, and the electronic key does not have to be moved like in the prior art. This is convenient.

Effect of the Invention

The electronic key system according to the present invention is convenient for the driver.

EMBODIMENTS OF THE INVENTION

First Embodiment

A first embodiment of an electronic key system will now be described with reference to the drawings.

Figure 1:
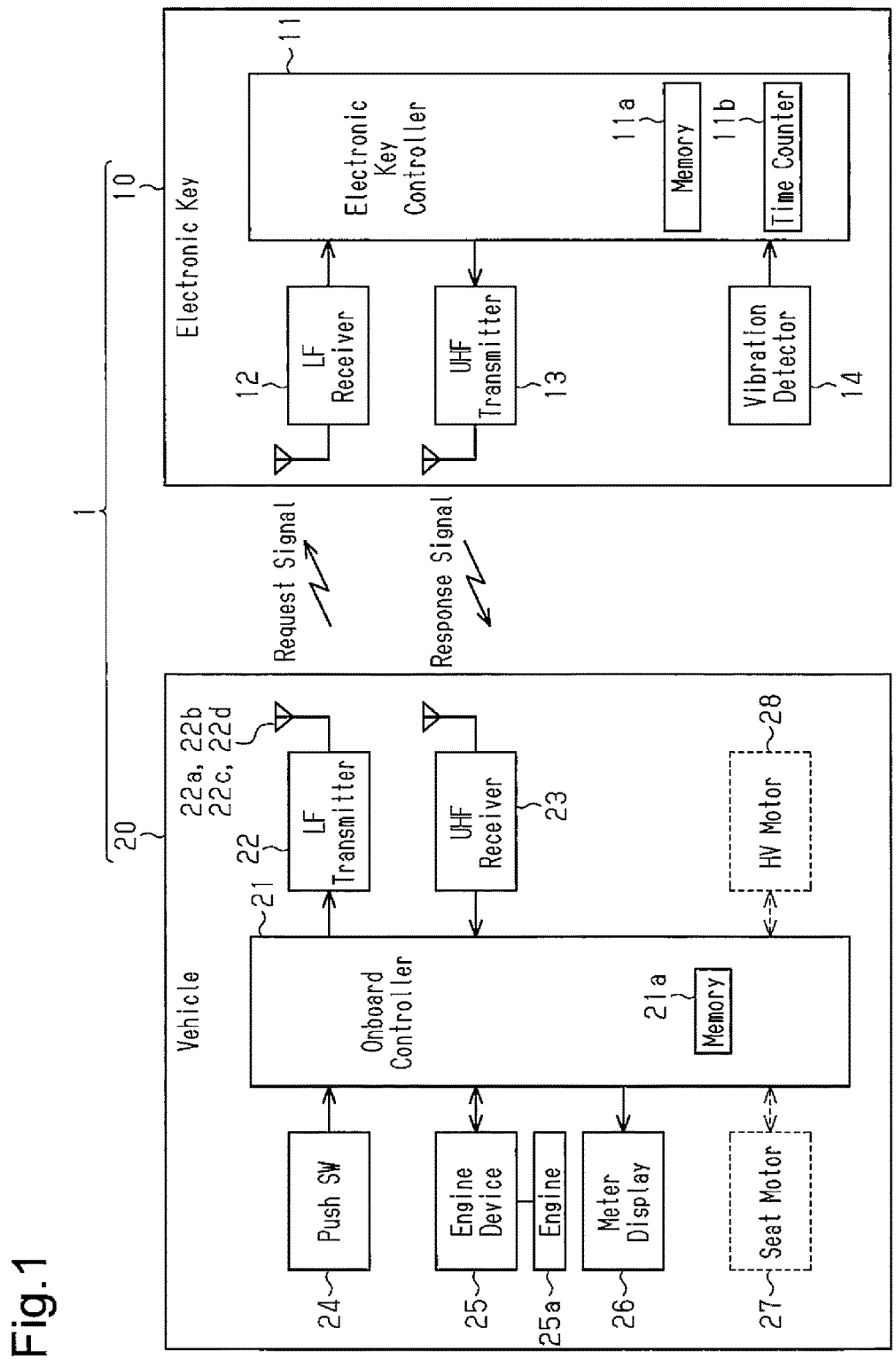
FIG. 1 is a schematic block diagram of an electronic key system.

Referring to FIG. 1, an electronic key system 1 executes various onboard controls through wireless communication between an electronic key 10 and a vehicle 20.

Electronic Key

As shown in FIG. 1, the electronic key 10 includes an electronic key controller 11, an LF receiver 12, a UHF transmitter 13, and a vibration detector 14. The LF receiver 12, the UHF transmitter 13, and the vibration detector 14 are each electrically connected to the electronic key controller 11.

The LF receiver 12 receives wireless signals on a low frequency (LF) band and demodulates the received signals to electrical signals.

The UHF transmitter 13 modulates electrical signals onto the ultrahigh frequency (UHF) band and transmits the modulated wireless signals.

The vibration detector 14 corresponds to vibration sensor and detects vibration of the electronic key 10.

The electronic key controller 11 includes a memory 11a that stores an ID code shared with the vehicle 20. Further, the memory 11a stores a mode shift time in which the operation mode of the electronic key controller 11 is shifted from a drive mode to a standby mode.

The electronic key controller 11 includes a time counter 11b.

In the standby mode, the electronic key controller 11 waits for a signal to be provided from the vibration detector 14. When a signal is provided from the vibration detector 14, the electronic key controller 11 shifts the operation mode from the standby mode to the drive mode. In addition to shifting from the standby mode to the drive mode, the electronic key controller 11 activates the time counter 11b.

In the drive mode, the electronic key controller 11 waits for a signal to be provided from the vibration detector 14 while controlling the LF receiver 12 and the UHF transmitter 13. In the drive mode, when the electronic key controller 11 receives a request signal through the LF receiver 12, the electronic key controller 11 generates a response signal including information indicating that the request signal has been received and the ID code stored in the memory 11*a*. Then, the electronic key controller 11 provides the generated response signal to the UHF transmitter 13. The UHF transmitter 13 receives the response signal from the electronic key controller 11, modulates the received response signal, and transmits the modulated response signal through wireless communication.

In the drive mode, the electronic key controller 11 constantly monitors whether or not the vibration detector 14 has detected vibration. Whenever the vibration detector 14 detects vibration, the electronic key controller 11 resets the count time of the time counter 11*b*. In the drive mode, the electronic key controller 11 shifts the operation mode from the drive mode to the standby mode when the count time of the time counter 11*b* exceeds the mode shift time. In addition to shifting the operation mode from the drive mode to the standby mode, the electronic key controller 11 stops driving the time counter 11*b* and resets the count time of the time counter 11*b*.

Vehicle

As shown in FIG. 1, the vehicle 20 includes an onboard controller 21, an LF transmitter 22, a UHF receiver 23, a push switch 24, and an engine device 25. Each of these elements, excluding the onboard controller 21, is electrically connected to the onboard controller 21.

The LF transmitter 22 modulates the electrical signals generated by the onboard controller 21 to wireless signals on the LF band and transmits the modulated wireless signals to communication areas set in the vehicle.

The UHF receiver 23 receives wireless signals on the UHF band and demodulates the received signals to electrical signals.

The push switch 24 is pushed.

The engine device 25 controls the starting and stopping of an engine 25*a*.

The onboard controller 21 includes a memory 21*a* that stores an ID code shared with the electronic key 10.

The onboard controller 21 generates a request signal in regular intervals. The request signal includes information that requests for the transmission of the ID code. The onboard controller 21 modulates the request signal with the LF transmitter 22 and transmits the modulated request signal through wireless communication.

When the onboard controller 21 receives a response signal in response to the request signal through the UHF receiver 23, the onboard controller 21 verifies the ID code that is included in the response signal with the ID code that is stored in the memory 21*a*. When ID verification is accomplished, the onboard controller 21 allows the engine 25*a* to be started. When pushing of the push switch 24 is detected in a state in which starting of the engine 25*a* is allowed, the onboard controller 21 starts the engine 25*a* with the engine device 25.

When pushing of the push switch 24 is detected in a state in which starting of the engine 25*a* is not allowed, that is, in a state in which ID verification is not accomplished, the onboard controller 21 generates a request signal. The generation of the request signal, that is, the pushing of the push switch 24 initiates ID verification. When ID verification is accomplished, the onboard controller 21 starts the engine 25*a* with the engine device 25.

When ID verification is initiated by the pushing of the push switch 24 but cannot be accomplished, the onboard controller 21 performs cranking with the engine device 25. Then, the onboard controller 21 generates the request signal again and tries to accomplish ID verification. When ID verification is accomplished, the onboard controller 21 starts the engine 25*a* with the engine device 25. If ID verification cannot be accomplished subsequent to cranking, the onboard controller 21 issues a notification indicating that ID verification has not been accomplished on, for example, a notification unit such as a display 26 without vibrating the engine 25*a*.

The engine 25*a* corresponds to a vibration unit and an onboard device, and the push switch 24 corresponds to an operation unit.

Communication Operation of Electronic Key System

The communication operation of the electronic key system 1 when the user attempts to move the vehicle after taking a nap in the vehicle will now be described. The communication operation is initiated when the user pushes the push switch 24.

Figure 2:
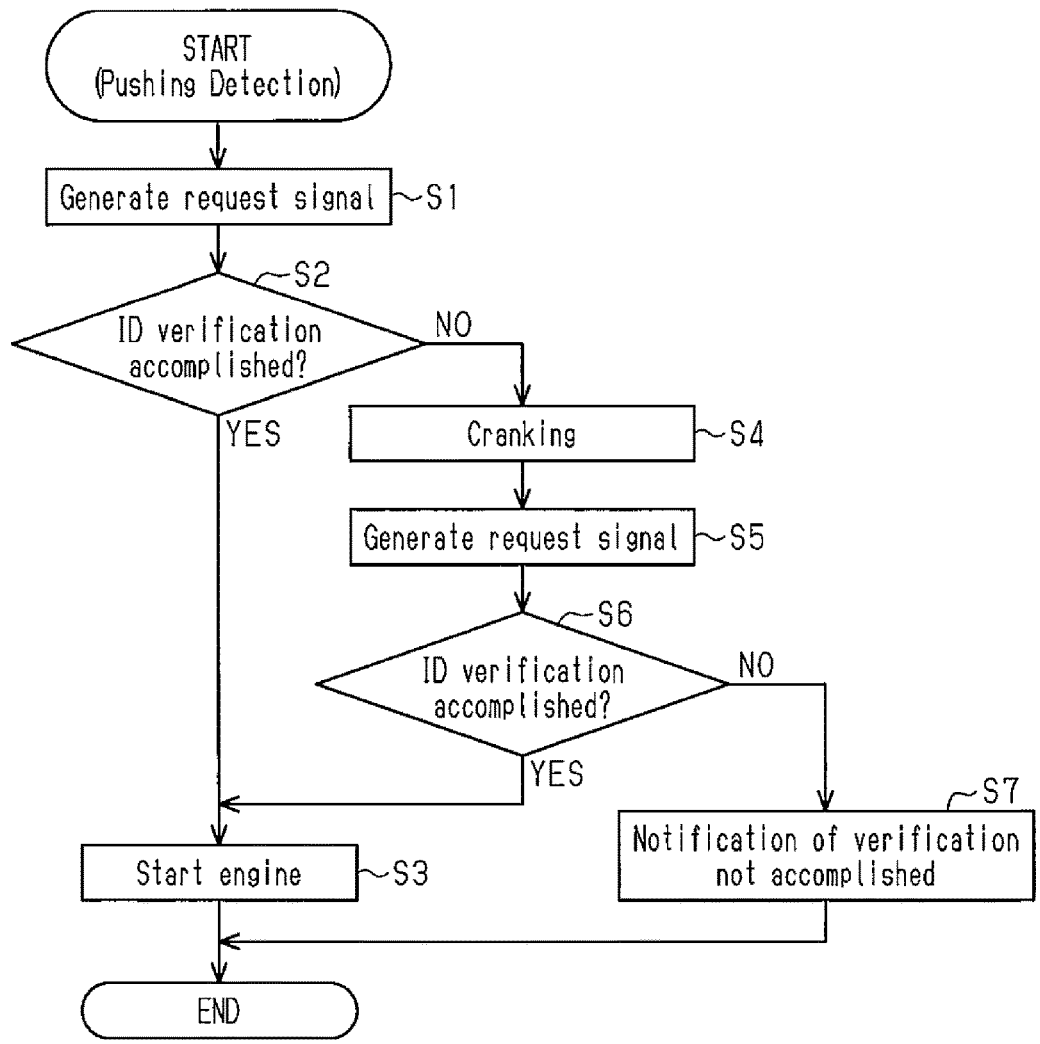
FIG. 2 is a sequence chart showing the processing procedures of an onboard controller.

As shown in FIG. 2, when detecting pushing of the push switch 24, the onboard controller 21 generates a request signal (step S1). Then, the onboard controller 21 determines whether or not ID verification has been accomplished (step S2).

When ID verification performed with the electronic key controller 11 is accomplished (YES in step S2), the onboard controller 21 starts the engine 25*a* with the engine device 25 (step S3) and then ends the series of processes. When the user has taken a nap in the vehicle, the user can vibrate (move) the electronic key 10 and shift the electronic key controller 11 from the standby mode to the drive mode. In such a case, the user only needs to push the push switch 24 to move the vehicle.

When ID verification performed with the electronic key controller 11 is not accomplished (NO in step S2), the onboard controller 21 performs cranking with the engine device 25 (step S4) and then generates a request signal (step S5).

When ID verification performed with the electronic key controller 11 is accomplished (YES in step S5), the onboard controller 21 proceeds to step S3. That is, the onboard controller 21 starts the engine 25*a* and then ends the series of processes. When the electronic key controller 11 is in the standby state because of the user taking a nap in the vehicle, the cranking vibrates the vehicle, and the vibration shifts the operation mode of the electronic key controller 11 from the standby state to the drive state. That is, when the operation mode of the electronic key controller 11 is the standby mode, the user can move the vehicle just by pushing the push switch 24.

When ID verification is not accomplished subsequent to cranking (NO in step S6), the onboard controller 21 issues a notification indicating that ID verification has not been accomplished on the notification unit such as the display 26 (step S7) and then ends the series of processes. In this manner, when ID verification is not accomplished even when cranking is performed and the vehicle is vibrated, the onboard controller 21 does not start the engine 25*a* and issues a notification indicating that ID verification has not been accomplished on the notification unit. This prompts the user to apply vibration to the electronic key 10 and switch the operation mode of the electronic key controller 11 from the standby mode to the drive mode.

The first embodiment has the advantages described below.

(1) The onboard controller 21 is configured to perform cranking with the engine device 25 under the condition that the push switch 24 has been operated. When the electronic key 10 is in the vehicle, the cranking vibrates the vehicle, and the vibration shifts the operation mode of the electronic key controller 11 from the standby mode to the drive mode. That is, the electronic key controller 11 is allowed to establish wireless communication with the onboard controller 21. Accordingly, for example, even when the driver takes a nap and the electronic key controller 11 is in the standby mode, the driver can move the vehicle just by pushing the push switch 24. Thus, the electronic key system 1 is more convenient than the prior art system.

(2) The onboard controller 21 performs cranking only when ID verification initiated by the operation of the push switch 24 is not accomplished. In this manner, cranking is not performed each time the push switch 24 is operated. Thus, the user will not be annoyed by the vibration.

(3) Subsequent to cranking, the onboard controller 21 generates a request signal again and tries to accomplish ID verification. This shortens the time for accomplishing ID verification as compared with when performing ID verification in regular intervals. That is, the vehicle can be moved within a short period of time. This is convenient for the user.

(4) The cranking vibrates the vehicle. Thus, regardless of where the electronic key 10 is located in the passenger compartment, the electronic key controller 11 can be switched from the standby mode to the drive mode.

Second Embodiment

A second embodiment of an electronic key system will now be described. The second embodiment differs from the first embodiment in that the onboard controller 21 actuates seat motors instead of performing cranking when the ID verification initiated by the operation of the push switch 24 is not accomplished. In the second embodiment, the actuation of the seat motors applies vibration to the seats. The time of the vibration varies in a predetermined manner. Information indicating the varied time of the vibration is used for a verification performed by the electronic key controller 11. Components that are the same in the first embodiment and the second embodiment will not be described.

Electronic Key

Referring to FIG. 1, in the drive mode, over a predetermined time from when the drive mode is switched from the standby mode, the electronic key controller 11 records information that indicates whether or not the vibration detector 14 has detected vibration and vibration action information. The vibration action information may be recorded to the memory 11a or to a volatile memory or the like that is separate from the memory 11a.

In the drive mode, when the electronic key controller 11 receives a request signal including vibration action request information that requests for the vibration action information, the electronic key controller 11 generates a response signal that includes previously recorded vibration action information.

Vehicle

As shown in FIG. 1, the vehicle 20 includes four seat motors 27. The four seat motors 27 are included in the front right seat, the front left seat, the rear right seat, and the rear left seat. The seat motors 27 are driven to move the corresponding seat toward the front or rear or change the reclined position of the seat.

Figure 4:
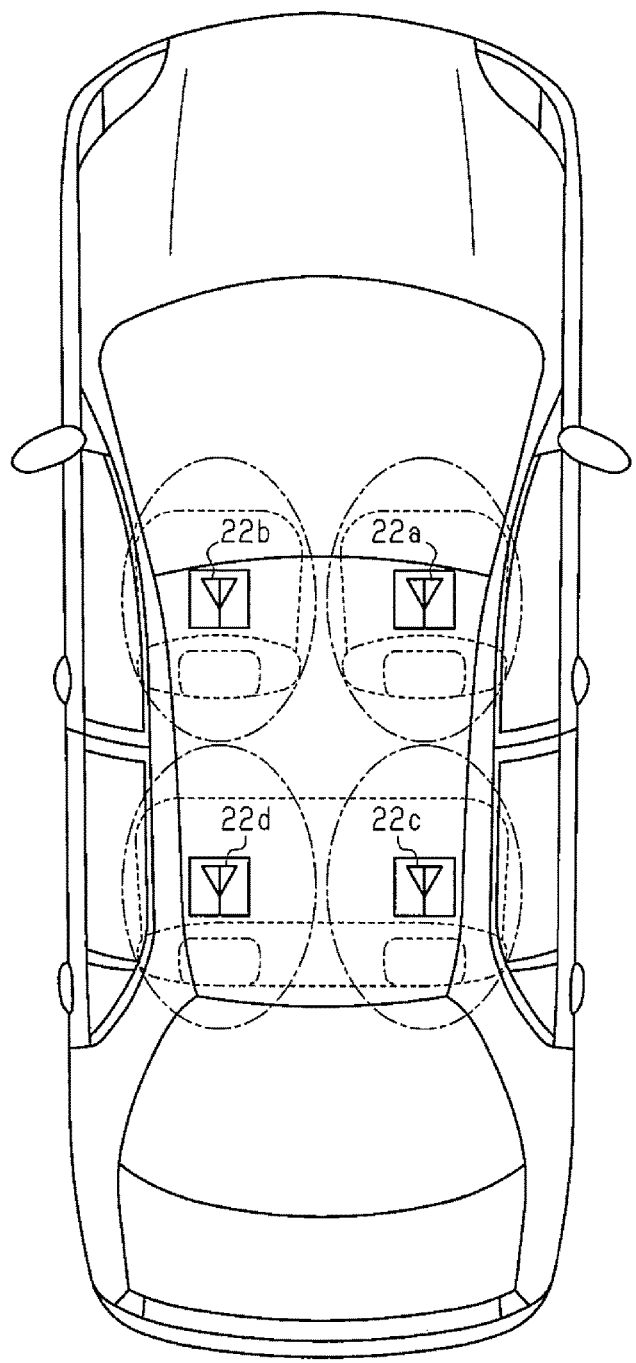
FIG. 4 is a plan view of a vehicle and shows four antennas and the communication ranges of the four antennas.

Four antennas 22a, 22b, 22c, and 22d are connected to the LF transmitter 22. As shown in FIG. 4, the antenna 22a is arranged in the front right seat. The antenna 22b is arranged in the front left seat. The antenna 22c is arranged in the rear right seat. The antenna 22d is arranged in the rear left seat. As shown by the single-dashed lines in FIG. 4, the output of the antenna 22a is adjusted so that a wireless signal reaches an area covering the front right seat. The output of the antenna 22b is adjusted so that a wireless signal reaches an area covering the front left seat. The output of the antenna 22c is adjusted so that a wireless signal reaches an area covering the rear right seat. The output of the antenna 22d is adjusted so that a wireless signal reaches an area covering the rear left seat.

The onboard controller 21 generates a request signal and antenna designation information in regular intervals. The request signal includes information that requests for the transmission of the ID code. The antenna designation information includes information that designates the antenna that transmits the request signal through wireless communication. The LF transmitter 22 transmits the request signal modulated on the LF band from the antenna designated by the antenna designation information.

When the previous ID verification was accomplished, the onboard controller 21 generates antenna designation information that is the same as that used in the previous ID verification. For example, when the previous ID verification was accomplished based on a request signal transmitted from the antenna 22a, the onboard controller 21 generates antenna designation information designating the same antenna 22a. The LF transmitter 22 receives the antenna designation information from the onboard controller 21 and transmits a request signal from the antenna 22a.

When the previous ID verification was not accomplished, the onboard controller 21 generates antenna designation information designating an antenna that differs from the antenna designated in the previous ID verification. For example, when the previous ID verification was not accomplished based on a request signal transmitted from the antenna 22a, the onboard controller 21 generates antenna designation information designating the antenna 22b that differs from the previous antenna 22a. The LF transmitter 22 receives the antenna designation information from the onboard controller 21, and transmits a request signal from the antenna 22b.

Figure 3:
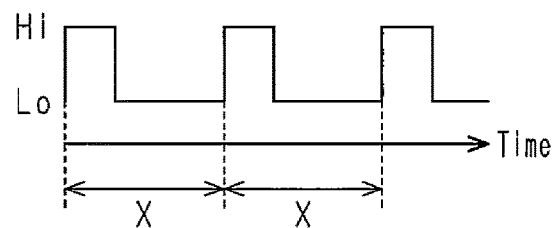
FIG. 3 is a time chart showing changes in the vibration time (vibration action) of a seat motor.

When the ID verification initiated by the pushing of the push switch 24 is not accomplished, the onboard controller 21 drives the seat motor 27 corresponding to the seat including the antenna that transmitted the request signal when the ID verification was last accomplished. For example, if the antenna 22c transmitted a request signal when ID verification was last accomplished, the onboard controller 21 drives the rear right seat motor 27. The onboard controller 21 drives the seat motor 27 so that vibration of the seat varies over a predetermined time (vibration action). For example, as shown in FIG. 3, the onboard controller 21 drives the seat motor 27 for a set number of times at a predetermined interval of time X (X is several milliseconds to several tens of milliseconds). The onboard controller 21 may drive the seat motors 27 over time instead of the number of times.

After driving the seat motor 27, the onboard controller 21 generates a request signal including the vibration action request information and tries to perform ID verification and verification of the vibration action information. When ID verification is accomplished and the vibration action information included in the response signal is verified by the information of the vibration action set for the onboard controller 21, the onboard controller 21 starts the engine 25a with the engine device 25. After driving the seat motor 27, when any one of the ID verification and the vibration action information verification is not accomplished, the onboard controller 21 does not start the engine 25a and issues a notification indicating that ID verification has not been accomplished on a notification unit such as the meter display 26.

The second embodiment has the advantages described below.

(5) The onboard controller 21 is configured to drive the seat motor 27 so that the corresponding seat is vibrated to produce a predetermined vibration action and then perform ID verification and verification of the vibration action information. When the vibration action information verification is accomplished, it can be assumed that the vibration of the seat motor 27 has shifted the operation mode of the electronic key 10 (electronic key controller 11) from the standby mode to the drive mode, that is, it can be assumed that the electronic key 10 is located in the vehicle. Thus, the onboard controller 21 starts the engine 25a. When the vibration action information verification is not accomplished, it can be assumed that the operation mode of the electronic key 10 (electronic key controller 11) has not been switched by the seat motor 27 from the standby mode to the drive mode, that is, it can be assumed that the electronic key 10 is located outside the vehicle. When the electronic key 10 is located outside the vehicle, the wireless communication may be used in an unauthorized manner by a relay. Thus, the onboard controller 21 does not drive the engine 25a. In this manner, the seat motors 27 are driven to perform ID verification and vibration action verification. Thus, the electronic key system 1 of the present example has a high level of security.

(6) The onboard controller 21 is configured so that if the ID verification initiated by the pushing of the push switch 24 is not accomplished, the onboard controller 21 drives the seat motor 27 corresponding to the seat including the antenna that transmitted the request signal when ID verification was last accomplished. The probability is high that the operation mode of the electronic key controller 11 was switched to the standby mode from the drive mode at the location where ID verification was last accomplished. Thus, the operation mode of the electronic key controller 11 can be switched from the standby mode to the drive mode by vibrating just one seat. Further, the seats other than the one vibrated to switch the operation mode of the electronic key controller 11 from the standby mode to the drive mode are not vibrated. Thus, the occupants of the vehicle will not be annoyed by the vibration.

The above embodiments may be modified as described below.

The engine of the first embodiment and the seat motors 27 of the second embodiment are each described as a vibration unit that vibrates at least part of the vehicle. However, the vibration unit may be formed by other structures. For example, in a hybrid system of which the travel drive source includes an engine and a motor, an HV motor 28, which is shown by broken lines in FIG. 1, may be driven to vibrate the vehicle. In this manner, even when the vibration unit has a structure that differs from the first and second embodiments, the user only needs to operate the push switch 24 to actuate an onboard device, which is the engine 25a in this case.

When driving the HV motor 28 to vibrate the onboard controller 21, it is preferred that the HV motor 28 be controlled to gradually strengthen the vibration. In such a configuration, if the electronic key 10 is located at a position where vibration of the vehicle is easily transmitted, the electronic key 10 would be able to establish wireless communication with the onboard controller 21 when the vibration is weak. Thus, the user will not be annoyed by the vibration of the vehicle produced by the HV motor 28. Even if the electronic key 10 is located at a position where vibration of the vehicle is not easily transmitted, the vibration of the vehicle is gradually strengthened. Thus, the electronic key 10 can establish wireless communication with the onboard controller 21 without vibrating the electronic key 10. This is convenient.

When the vibration unit of the vehicle includes multiple structures, such as the engine 25a, the seat motor 27, and the HV motor 28, the vibration unit can be switched to change the strength of the vibration applied to the vehicle. For example, the vehicle is vibrated in the order of the seat motor 27, the HV motor 28, and the engine 25a. This obtains the advantages described above.

In the first embodiment, the onboard controller 21 can control the engine device 25 to perform cranking and produce a vibration action that differs from the vibration action of the vehicle produced by the previous cranking. For example, the timing at which the cranking is performed may be changed, and the number of times cranking is performed may be changed. In this case, the vibration action detected by the electronic key 10 differs from the previous vibration action. Accordingly, even when someone recognizes the vibration action of the vehicle, the information of the recognized vibration action will differ from the next vibration action of the vehicle. This modified example may be applied to a case in which the seat motors 27 are employed like in the second embodiment and in a case in which the HV motor 28 is employed like in the modified example described above.

When the vibration unit of the vehicle includes multiple structures, such as the engine 25a, the seat motor 27, and the HV motor 28, the vibration unit can be switched to change the vibration action. This obtains the advantages described above.

In the first and second embodiments, the onboard device is not limited to a travel drive source such as the engine 25a. For example, the onboard device may be a vehicle accessory such as a television, audio equipment, and a navigation system. Further, the operation unit is not limited to the push switch 24 that is used to start the travel drive source and may be a vehicle accessory switch, a switch for opening and closing the window, a light switch, a lever switch for actuating the blinker or the wiper, or the like.

In the second embodiment, the onboard controller 21 drives the seat motor 27 to vibrate a seat and then performs ID verification and verification of the vibration action information. However, the vibration action information does not necessarily have to be verified. A system employing such a configuration also obtains advantage (6) of the second embodiment.

In the second embodiment, four antennas are used to transmit LF band wireless signals. However, the number of antennas is not limited to four. For example, there may be two antennas, one for the front seats and one for the rear seats. In this case, the onboard controller 21 drives the seat motors 27 to drive only the front seats or only the rear seats. Such a configuration obtains the same advantages as the second embodiment. Further, when employing an antenna that can locate the electronic key by switching the directivity or measuring the signal intensity, the number of antennas may be one.

In the second embodiment, the onboard controller 21 verifies the change in the vibration time as the variable vibration action but instead may perform verification using amplitude, vibration time, vibration axis, or the like.

The system of the first embodiment uses the engine 25a as the onboard device and the vibration unit. However, the onboard device and the vibration unit may be different like in the second embodiment in which the engine 25a functions as the onboard device and the seat motor 27 functions as the vibration unit.

In the first and second embodiments, the onboard controller 21 may perform cranking or drive the seat motor 27 whenever the push switch 24 is operated.

In the first and second embodiments, the meter display 26 functions as the notification unit. However, other structures may be used as the notification unit. For example, the notification unit only needs to be perceived by a human and may be a speaker, a navigation system display, or the like.

In the first and second embodiments, the electronic key system 1 uses radio waves in the LF band and the UHF band to perform wireless communication but may use radio waves in other bandwidths to perform wireless communication. Further, wireless communication performed in the system may be in compliance with other communication standards such as BLUETOOTH (registered trademark).

In the first and second embodiments, the electronic key 10 does not have to be a vehicle-dedicated key and may be an electronic terminal such as a smartphone.

The invention claimed is:

1. An electronic key system comprising:
   a vehicle including
      an onboard device,
      an onboard controller that controls the onboard device,
      an operation unit that is operable by a user, and
      a vibration unit that vibrates at least part of the vehicle;
   an electronic key including a vibration sensor that detects vibration, wherein the electronic key is configured to be capable of establishing wireless communication with the onboard controller when the vibration sensor detects vibration;
   wherein the onboard controller is configured to vibrate at least part of the vehicle with the vibration unit in response to operation of the operation unit by the user, determine whether wireless communication has been established between the electronic key and the vehicle, and actuate the onboard device when determining that wireless communication has been established.

2. The electronic key system according to claim 1, wherein:
   the vibration unit vibrates the at least part of the vehicle to produce predetermined variable action; and
   the determination of whether the wireless communication has been established includes
      by the onboard controller, transmitting a request signal to request for information indicating the variable action of the vibration detected by the vibration sensor,
      by the electronic key, transmitting, through wireless communication, information indicating the variable action of the vibration detected by the vibration sensor in response to the request signal from the onboard controller,
      by the onboard controller, verifying the predetermined variable action of the vibration with the variable action of the vibration from the electronic key, and
      by the onboard controller, determining whether wireless communication has been established from the verification result.

3. The electronic key system according to claim 2, wherein the predetermined variable action of the vibration includes a variable action that differs from a variable action of the vibration when the vibration unit was previously vibrated.

4. The electronic key system according to claim 1, wherein
   the onboard controller detects a position of the electronic key based on the wireless communication established between the electronic key and the vehicle, and
   the onboard controller vibrates a portion of the vehicle that corresponds to the position of the electronic key detected in the wireless communication that was previously established in response to operation of the operation unit by the user.

5. The electronic key system according to claim 4, wherein
   the vibration unit is one of a plurality of vibration units,
   the vibration units include a plurality of seat motors respectively arranged in a plurality of seats, and
   the onboard controller vibrates a seat located at the position of the electronic key detected in the previously established wireless communication with the corresponding seat motor in response to operation of the operation unit by the user.

6. The electronic key system according to claim 1, wherein the onboard controller gradually strengthens vibration of the vibration unit when vibrating the at least part of the vehicle.

7. The electronic key system according to claim 1, wherein:
   the vehicle further includes a memory that stores at least one ID code;
   the determination of whether the wireless communication has been established further includes
      by the onboard controller, transmitting a request signal that requests for an ID code of the electronic key in response to operation of the operation unit by the user, and
      by the onboard controller, receiving a response signal including the ID code from the electronic key and verifying the ID code of the received response signal with the at least one ID code stored in the memory; and
   the verification result includes a verification result of the ID code and a verification result of the variable action of the vibration.

8. The electronic key according to claim 7, wherein by the onboard controller, determining whether wireless communication has been established in accordance with a verification result includes
   determining that wireless communication has been established when verification of the ID code and a verification result of variable action of the vibration have been accomplished, and
   determining that the wireless communication has not been established when a response signal has not been received from the electronic key or when at least one of verification of the ID code and verification of the variable action of the vibration has not been accomplished.

9. The electronic key system according to claim 1, comprising at least one of an engine, an HV motor, and a seat motor.

10. The electronic key system according to claim 1, wherein vibrating at least part of the vehicle with the vibration unit includes:
- by the onboard controller, determining in advance whether the wireless communication will be established before vibrating at least part of the vehicle in response to operation of the operation unit by the user;
- by the onboard controller, vibrating at least part of the vehicle with the vibration unit when determining in advance that the wireless communication will not be established; and
- by the onboard controller, actuating the onboard device without vibrating the at least part of the vehicle when determining in advance that the wireless communication will not be established.

\* \* \* \* \*